（12） United States Patent
Seo

(10) Patent No.: US 9,516,658 B2
(45) Date of Patent: Dec. 6, 2016

(54) METHOD FOR TRANSMITTING AND RECEIVING UPLINK SIGNAL ON BASIS OF INTERFERENCE MEASUREMENT IN BASE STATION COOPERATIVE WIRELESS COMMUNICATION SYSTEM AND DEVICE FOR SAME

(71) Applicant: LG ELECTRONICS INC., Seoul (KR)

(72) Inventor: Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 14/417,419

(22) PCT Filed: Jul. 19, 2013

(86) PCT No.: PCT/KR2013/006491
§ 371 (c)(1),
(2) Date: Jan. 26, 2015

(87) PCT Pub. No.: WO2014/021573
PCT Pub. Date: Feb. 6, 2014

(65) Prior Publication Data
US 2015/0208424 A1 Jul. 23, 2015

Related U.S. Application Data

(60) Provisional application No. 61/679,052, filed on Aug. 2, 2012.

(51) Int. Cl.
*H04W 72/08* (2009.01)
*H04B 17/00* (2015.01)
(Continued)

(52) U.S. Cl.
CPC ........ *H04W 72/082* (2013.01); *H04B 17/00* (2013.01); *H04B 17/345* (2015.01);
(Continued)

(58) Field of Classification Search
None
See application file for complete search history.

(56) References Cited

U.S. PATENT DOCUMENTS 8,072,986 B2 12/2011 Wakabayashi
2009/0047971 A1 2/2009 Fu
(Continued)

FOREIGN PATENT DOCUMENTS

KR 10-2010-0059333 A 6/2010
KR 10-2010-0092910 A 8/2010
WO WO 2011/118141 A1 9/2011

*Primary Examiner* — Bunjob Jaroenchonwanit
(74) *Attorney, Agent, or Firm* — Birch, Stewart, Kolasch & Birch, LLP

(57) ABSTRACT

Disclosed is a method for enabling a specific reception point to receive an uplink signal from a terminal on the basis of interference control in a base station cooperative wireless communication system. Particularly, the method comprises the steps of: receiving, from an adjacent reception point, information regarding one or more resource groups for which the occurrence of the same interference is assumed; measuring, in a first resource belonging to the one or more resource groups, interference occurring from another uplink signal transmitted to the adjacent reception point; transmitting, to the terminal, scheduling information of an uplink signal in a second resource belonging to the one or more resource groups such that the measured interference is minimized; and receiving the uplink signal from the terminal in the second resource.

3 Claims, 11 Drawing Sheets

(51) Int. Cl.
    *H04L 1/00*          (2006.01)
    *H04W 24/00*       (2009.01)
    *H04W 72/12*        (2009.01)
    *H04B 17/345*      (2015.01)
    *H04B 17/382*      (2015.01)

(52) U.S. Cl.
    CPC ............. *H04B 17/382* (2015.01); *H04L 1/00* (2013.01); *H04W 24/00* (2013.01); *H04W 72/1231* (2013.01)

(56) References Cited

U.S. PATENT DOCUMENTS

| | | | |
|---|---|---|---|
| 2010/0130244 A1 | 5/2010 | Hong et al. | |
| 2010/0246503 A1* | 9/2010 | Fox .................... | H04W 52/243 370/329 |
| 2011/0310792 A1 | 12/2011 | Lee et al. | |
| 2013/0010750 A1 | 1/2013 | Hoshino et al. | |
| 2013/0084907 A1* | 4/2013 | Shen .................. | H04W 72/082 455/501 |
| 2013/0102350 A1* | 4/2013 | Sawai .................. | H04W 52/16 455/517 |
| 2014/0328309 A1* | 11/2014 | Comstock ........... | H04W 72/082 370/329 |

* cited by examiner

--Prior Art--

FIG. 2
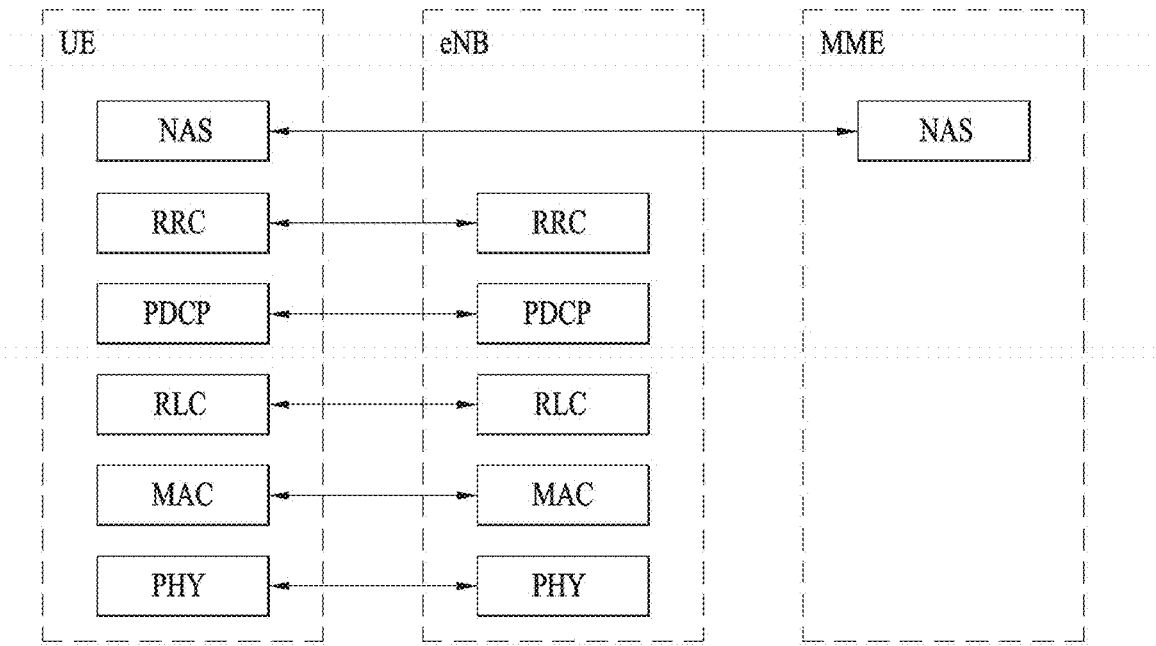
(a) control plane protocol stack
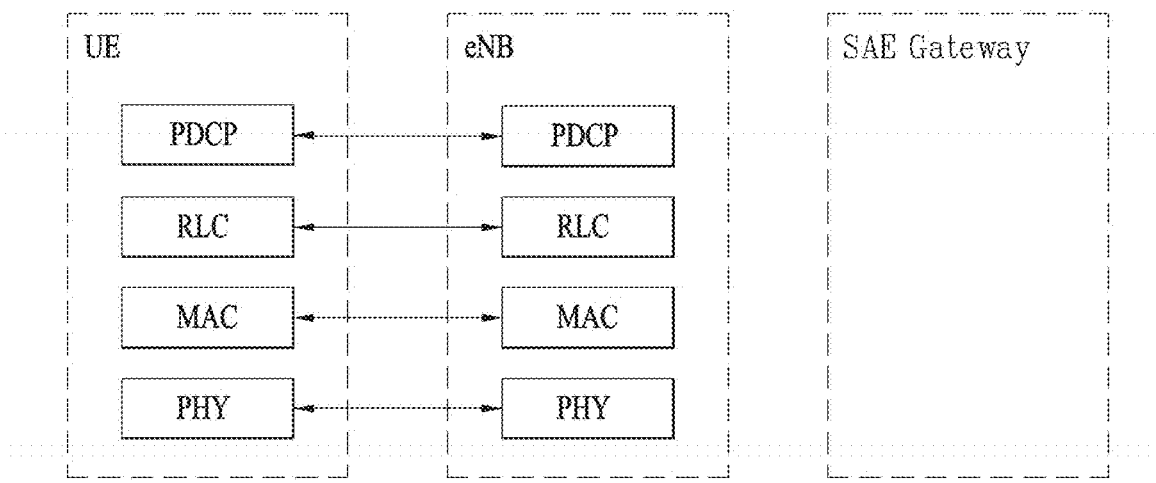
(b) user plane protocol stack
--Prior Art--

--Prior Art--

--Prior Art--

--Prior Art--

--Prior Art--

--Prior Art--

--Prior Art--

FIG. 11
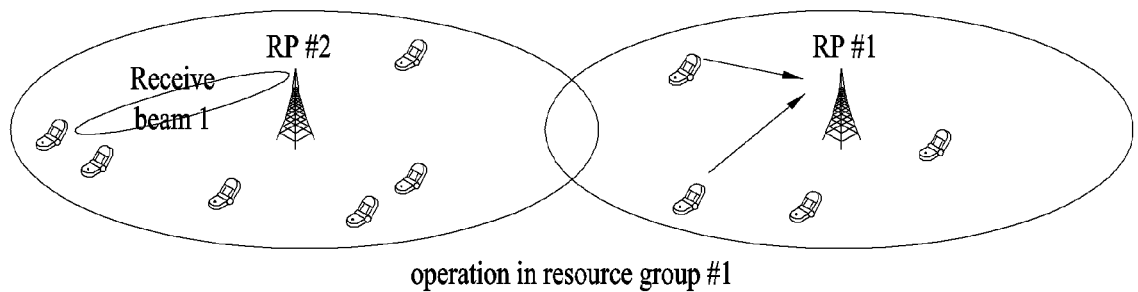
operation in resource group #1
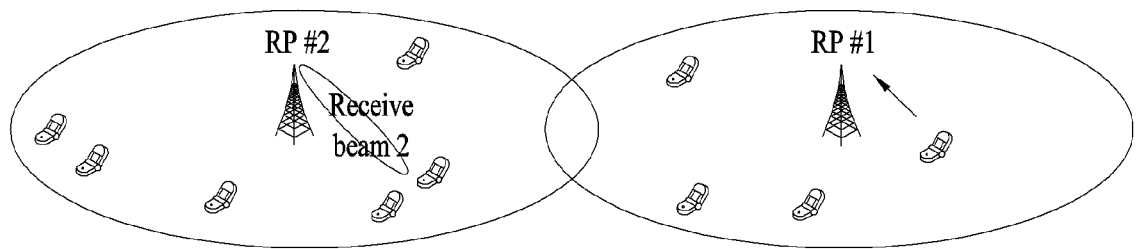
operation in resource group #2
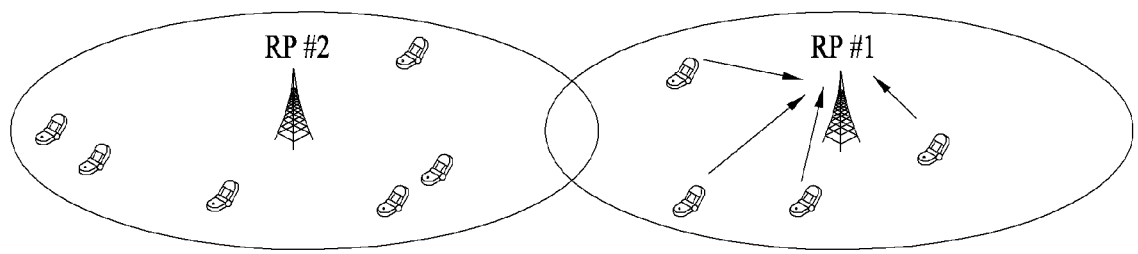
operation in resource group #3

METHOD FOR TRANSMITTING AND RECEIVING UPLINK SIGNAL ON BASIS OF INTERFERENCE MEASUREMENT IN BASE STATION COOPERATIVE WIRELESS COMMUNICATION SYSTEM AND DEVICE FOR SAME

CROSS REFERENCE TO RELATED APPLICATIONS

This application is the National Phase of PCT International Application No. PCT/KR2013/006491, filed on Jul. 19, 2013, which claims priority under 35 U.S.C. 119(e) to U.S. Provisional Application No. 61/679,052, filed on Aug. 2, 2012, all of which are hereby expressly incorporated by reference into the present application.

TECHNICAL FIELD

The present invention relates to a wireless communication system, and more particularly, to a method of transmitting and receiving an uplink signal based on interference measurement in a base station cooperative wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

A technical task of the present invention is to propose a method of transmitting and receiving an uplink signal based on interference measurement in a base station cooperative wireless communication system and an apparatus therefor based on the discussion described in the foregoing description.

Technical Solution

To achieve these and other advantages and in accordance with the purpose of the present invention, as embodied and broadly described, according to one embodiment, a method of receiving an uplink signal, which is received by a specific reception point from a terminal based on interference control in a base station cooperative wireless communication system, includes the steps of receiving information on one or more resource groups in which occurrence of identical interference is assumed from a neighboring reception point, measuring interference, which is occurred from a different uplink signal transmitted to the neighboring reception point, in a first resource belonging to the one or more resource groups, transmitting uplink signal scheduling information in a second resource belonging to the one or more resource groups to the terminal to minimize the measured interference and receiving the uplink signal from the terminal in the second resource.

In this case, the first resource corresponds to a combination of a first time resource and a first frequency resource and the second resource corresponds to a combination of a second time resource and a second frequency resource. Moreover, a relation between the first time resource and the second time resource corresponds to a data retransmission interval.

Additionally, the uplink signal scheduling information can include information on reception beamforming and the reception beamforming is determined based on a characteristic of the measured interference.

Preferably, the method can further include the step of transmitting interference control feedback information to the neighboring reception point. The neighboring reception point updates the information on the one or more resource groups using the interference control feedback information.

To further achieve these and other advantages and in accordance with the purpose of the present invention, according to a different embodiment, a method of transmitting an uplink signal, which is transmitted to a specific reception point by a terminal based on interference control in a base station cooperative wireless communication system, includes the steps of receiving uplink signal scheduling information in a second resource belonging to one or more resource groups in which occurrence of identical interference is assumed and transmitting the uplink signal to the specific reception point in the second resource, wherein information on the one or more resource groups is delivered to the specific reception point from a neighboring reception point, wherein the uplink signal scheduling information is configured to minimize interference affecting the uplink signal and wherein the interference occurs from a different uplink signal transmitted to the neighboring reception point in a first resource belonging to the one or more resource groups and preceding the second resource.

Advantageous Effects

According to embodiments of the present invention, a base station and a user equipment can efficiently transceive an uplink signal with each other in a base station cooperative wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 shows a control plane and a user plane of a radio interface protocol between a UE and an evolved universal terrestrial radio access network (E-UTRAN) based on a 3GPP radio access network standard;

FIG. 11 is a diagram for an example of performing an interference control operation based on a resource group according to embodiment of the present invention;

BEST MODE

Mode for Invention

Figure 1:
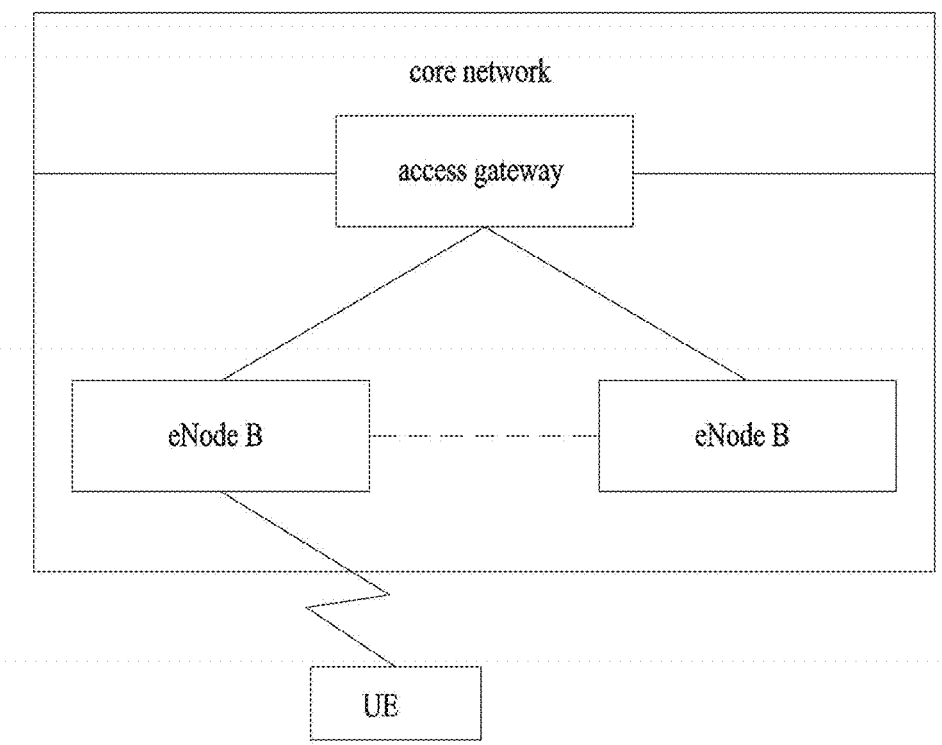
FIG. 1 is a diagram showing a network structure of an evolved universal mobile telecommunications system (E-UMTS) as a mobile communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

FIG. 2 shows a control plane and a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, re-configuration, and release of radio bearers (RBs). The RB is a service that the second layer provides for data communication between the UE and the network. To accomplish this, the RRC layer of the UE and the RRC layer of the network exchange RRC messages. If an RRC connection is established between the UE and the E-UTRAN, the UE is in RRC Connected mode and otherwise, the UE is in RRC idle mode. A non-access stratum (NAS) layer above the RRC layer performs functions including session management and mobility management.

One cell of the eNB is set to use a bandwidth such as 1.25, 2.5, 5, 10, 15, or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
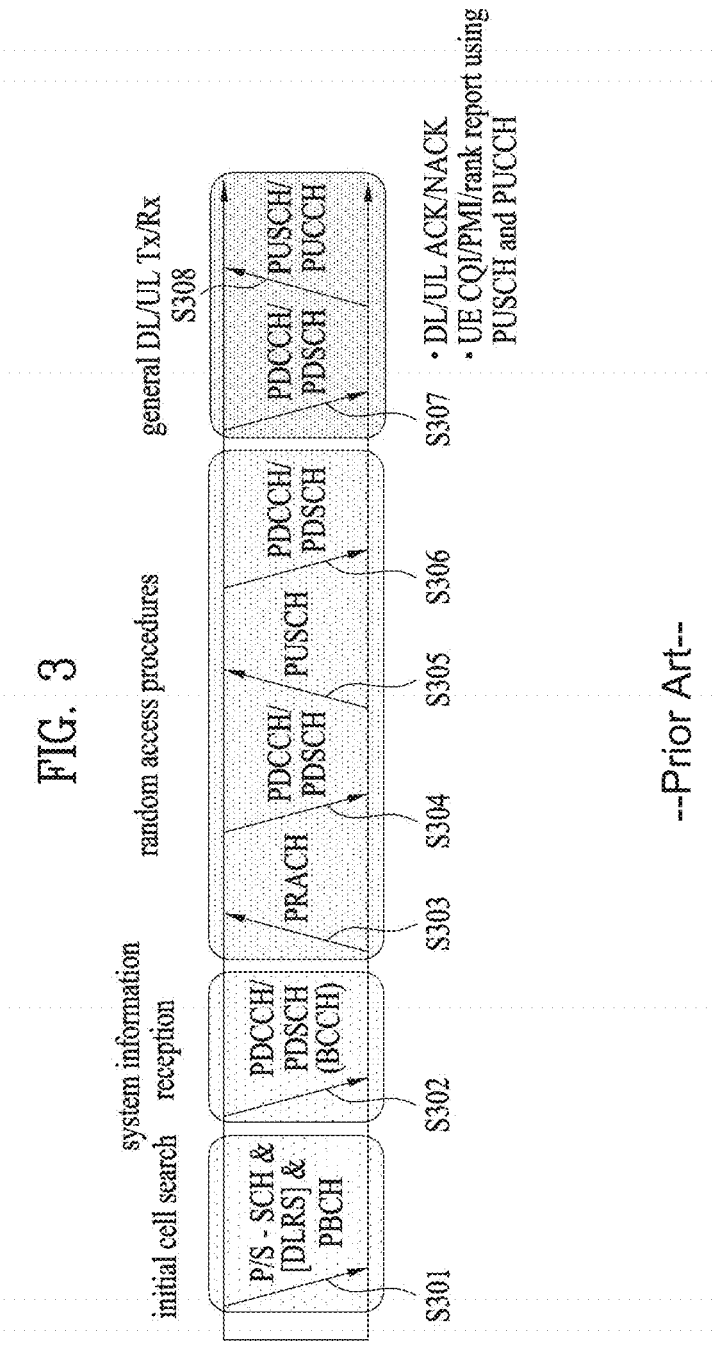
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a downlink reference signal (DL RS) so as to confirm a downlink channel state in the initial cell search step.

The UE which completes the initial cell search may receive a physical downlink control channel (PDCCH) and a physical downlink shared channel (PDSCH) according to information included in the PDCCH so as to acquire more detailed system information (S302).

Meanwhile, if the eNB is initially accessed or radio resources for signal transmission are not present, the UE may perform a random access procedure (RACH) (step S303 to S306) with respect to the eNB. In this case, the UE may transmit a specific sequence through a physical random access channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
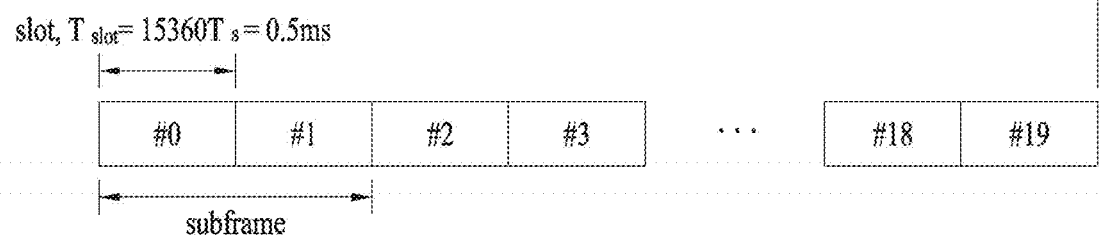
FIG. 4 illustrates an exemplary control channel included in the control region of a subframe in a radio frame.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A transmission time interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
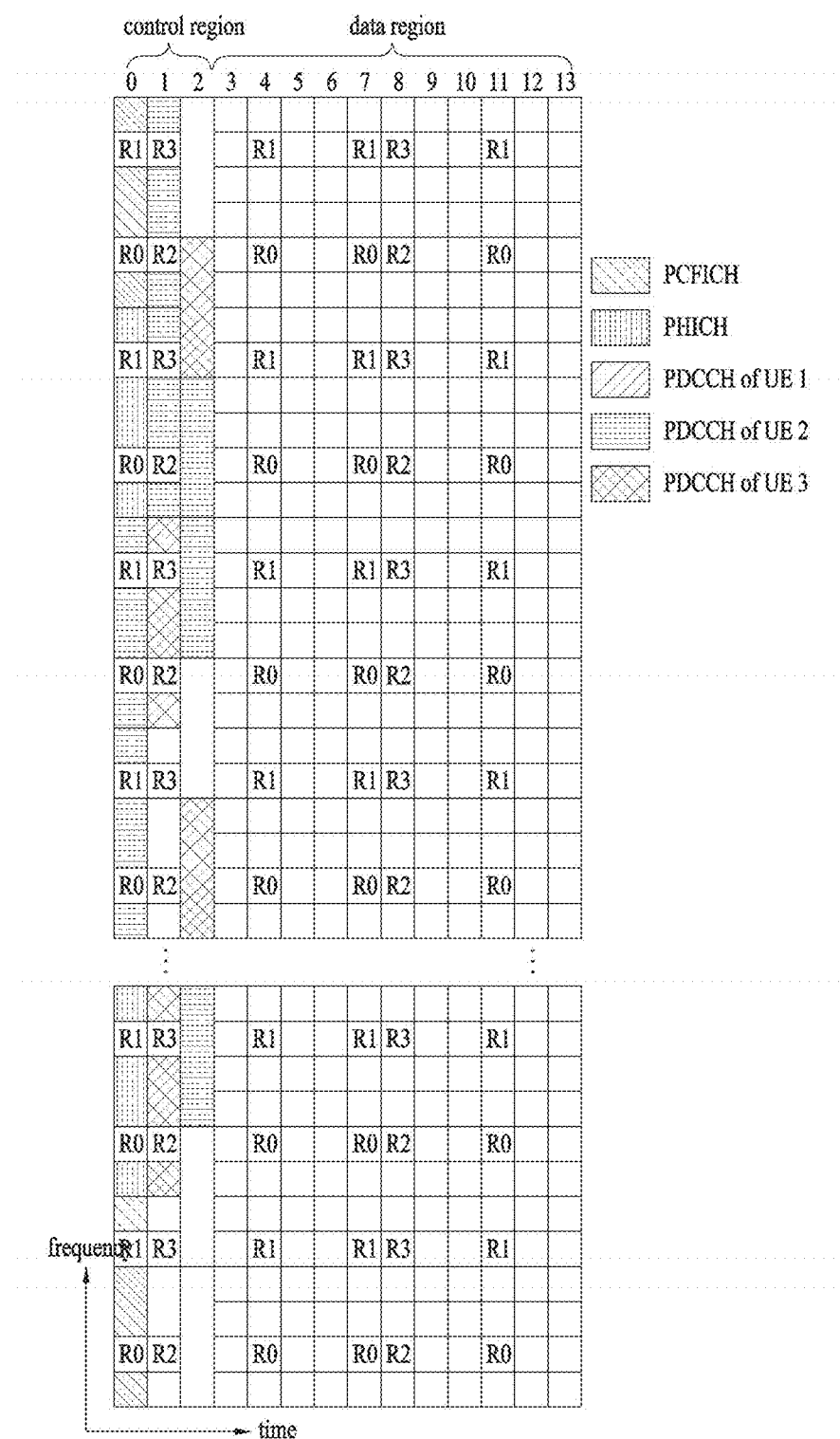
FIG. 5 illustrates a structure of a downlink (DL) subframe in an LTE system.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-arq indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 resource element groups (REGs), each REG being distributed to the control region based on a cell identity (ID). One REG includes 4 resource elements (REs). An RE is a minimum physical resource defined by one subcarrier by one OFDM symbol. The PCFICH indicates 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Here, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
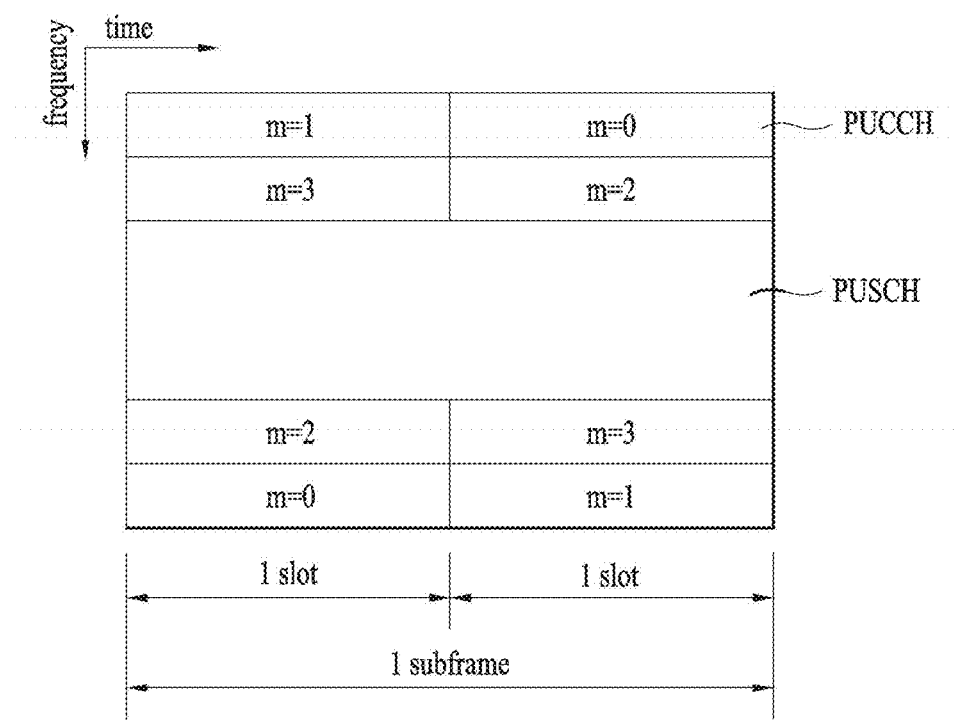
FIG. 6 illustrates a structure of an uplink (UL) subframe in an LTE system.

FIG. 6 illustrates a structure of a UL subframe in the LTE system.

Referring to FIG. 6, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one resource block (RB) having a different frequency in each slot of a subframe. That is, the two RBs allocated to the PUCCH frequency-hop over the slot boundary of the subframe. Particularly, PUCCHs with m=0, m=1, m=2, and m=3 are allocated to a subframe in FIG. 6.

Figure 7:
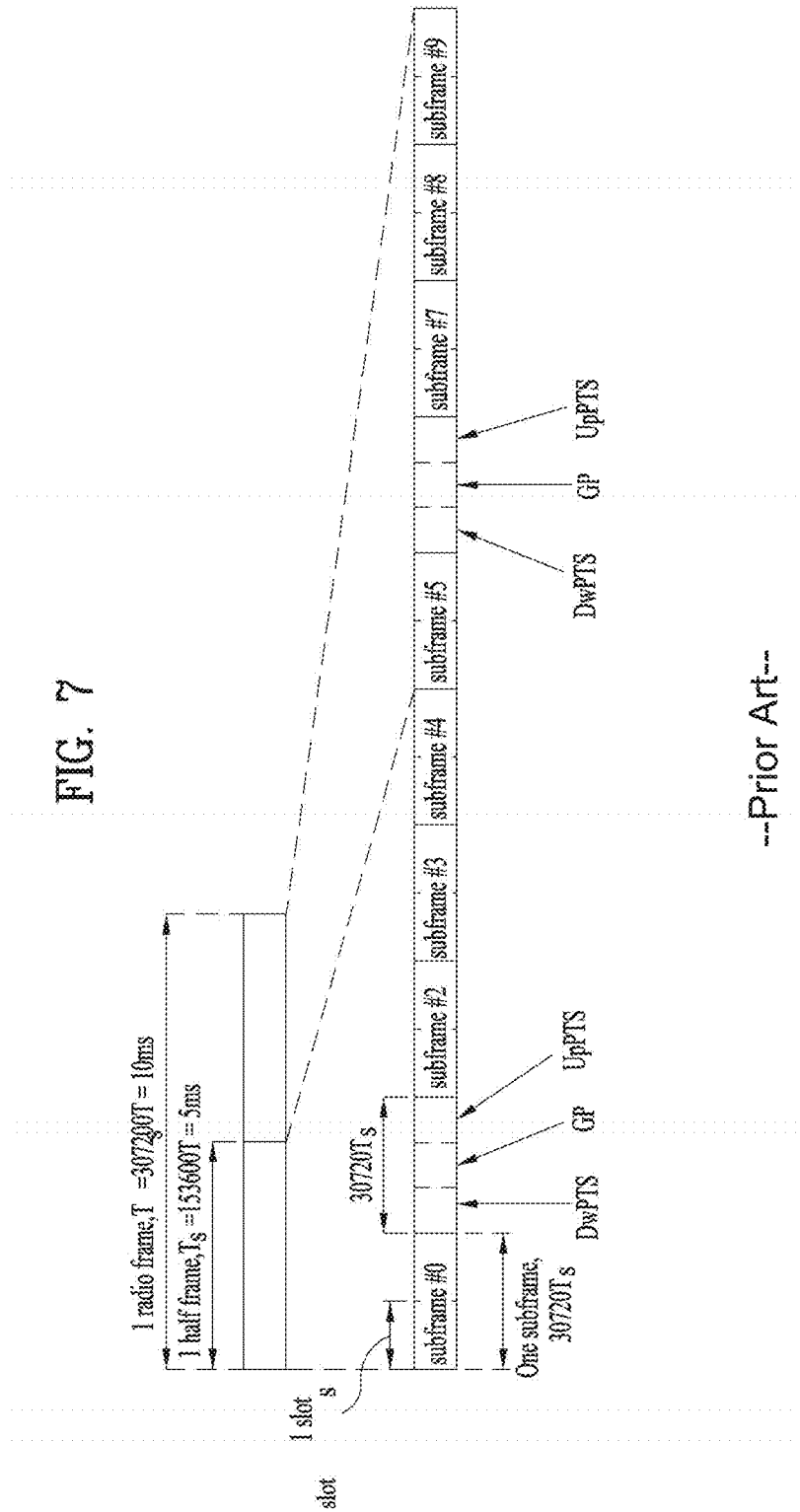
FIG. 7 illustrates a structure of a radio frame in an LTE TDD system.

FIG. 7 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Special subframe configuration is defined in the current 3GPP standard document as shown in Table 1 below. In Table 1, $T_s=1/(15000\times2048)$ refers to a DwPTS and a UpPTS and the remaining region is configured as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Meanwhile, in an LTE TDD system, a UL/DL configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D indicates a downlink subframe, U indicates an uplink subframe, and S means the special subframe. Also, the above Table 2 represents a downlink-uplink switching period of uplink/downlink subframe configuration in each system.

Table 3 below shows an uplink subframe number (index) for transmitting uplink ACK/NACK for a downlink signal at a UE in a TDD system based on a 3GPP LTE system.

TABLE 3

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

In particular, "–" indicates that an uplink subframe is configured and a numeral assigned to each subframe number indicates an uplink subframe index, that is, an uplink subframe index linked to the downlink subframe.

Table 4 below shows a downlink subframe number (index) for receiving downlink ACK/NACK for PUSCH, i.e., PHICH at a UE in a TDD system based on a 3GPP LTE system. In particular, in case of transmitting PUSCH in a subframe index n, PHICH is received in n+$k_{PHICH}$. In Table 4, each number assigned to the subframe index n corresponds to $k_{PHICH}$.

TABLE 4

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 8:
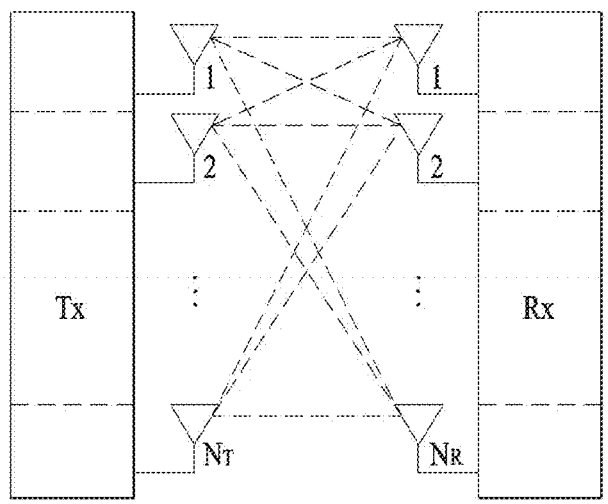
FIG. 8 is a block diagram of a general multi-antenna (MIMO) communication system.

A block diagram of a general multi-antenna (MIMO) communication system is depicted in FIG. 8. NT number of transmitting antenna is installed in a transmitting end and NR number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as Ro in case of using a single antenna, the transfer rate using multiple antennas can be theoretically increased as much as the maximum transfer rate Ro multiplied by a rate of increase Ri, as shown in the following Equation 1. In this case, the Ri is a smaller value of the NT and the NR.

$$R_i = \min(N_T, N_R)$$ [Equation 1]

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 8, assume that there exist NT number of transmitting antenna and NR number of receiving antenna. First of all, if we look into a transmission signal, since the maximum number of information capable of being transmitted is NT in case that there exists NT number of transmitting antenna, transmission information can be represented as a vector in the following Equation 2.

$$s = [s_1, s_2, \ldots, s_{N_T}]^T$$ [Equation 2]

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$

And, if $\hat{s}$ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Meanwhile, let's consider a case that the NT number of transmission signal $x_1, x_2, \ldots, x_{N_T}$, which is practically transmitted, is configured in a manner of applying a weighted matrix W to the adjusted information vector Ŝ. In this case, the weighted matrix performs a role of distributing the transmission information to each of the antennas according to the situation of the transmission channel and the like. The transmission signal $x_1, x_2 \ldots, x_{N_T}$ can be represented using a vector X in the following Equation 5. In this case, $W_{ij}$ means a weighting between an ith transmitting antenna and jth information. The W is called the weighted matrix or a precoding matrix.

$$x = \begin{bmatrix} x_1 \\ x_2 \\ \vdots \\ x_i \\ \vdots \\ x_{N_T} \end{bmatrix}$$ [Equation 5]

$$= \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

$$\text{rank}(H) \leq \min(N_T, N_R)$$ [Equation 6]

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Equation 7 in the following.

$$\text{\# of streams} \leq \text{rank}(H) \leq \min(N_T, N_R)$$ [Equation 7]

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (COMP joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/ beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/ beamforming method is determined by the coordinating cells (or base stations).

The present invention proposes a method capable of performing interference coordination in case of transmitting and receiving uplink data.

Figure 9:
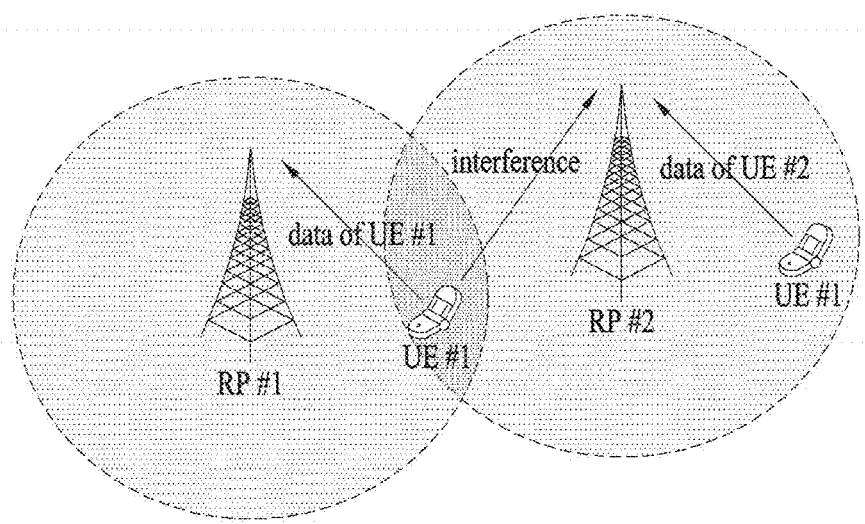
FIG. 9 is a diagram for an example of a situation requiring interference control in case that uplink communication is performed in a base station cooperative wireless communication system.

FIG. 9 is a diagram for an example of a situation requiring interference control in case that uplink communication is performed in a base station cooperative wireless communication system.

Referring to FIG. 9, a UE #1 transmits uplink data to an RP (reception point) #1. Yet, a signal of the uplink data causes interference for an uplink signal of a different UE i.e., a UE #2 in an RP #2. In this case, it is required to configure data of the UE #2 to be received well in an interference situation interfered by the UE #1 in a manner of appropriately selecting precoding, transmit power or the like of the UE #2 transmitting data to the RP #2.

In this case, each RP may correspond to an eNB forming a separate cell or a distributed reception antenna belonging to an identical cell. In the following, assume that the interference causing UE #1 is scheduled by the RP #1 and the interfered UE #2 is scheduled by the RP #2.

First of all, the RP #2 can identify attribute of interference (e.g., a size of interference power or a spatial characteristic of an interference signal) affecting the RP #2 in each frequency resource at every timing point. As an example, the RP #2 preferentially detects data to be received by the RP #2 in each resource (e.g., data of the UE #2 in FIG. 9) and considers the rest of data of which the detected data is excluded from the whole of the received data as an interference signal. By measuring the interference signal, the attribute of the interference can be identified. This operation is called interference measurement.

In other word, each RP can identify interference attribute in each resource in a manner of performing interference measurement. If the interference attribute is identified, each RP can perform uplink scheduling capable of securing optimal performance under the identified interference attribute. As an example, the RP #2 performs interference measurement in a specific resource and calculates a covariance matrix of an interference signal measured by a reception antenna of the RP #2. If reception beamforming is performed in the calculated covariance matrix in a direction in which a unique value (Eigen value) is smaller, impact of the interference signal is lowered. By doing so, it is able to schedule a use of a UE or a precoding matrix suitable for the reception beamforming situation.

Yet, it is impossible to perform an interference control based on interference measurement measured in a corresponding resource. This is because an RP performs scheduling and should deliver the scheduling information to a UE before the UE actually performs transmission in the corresponding resource. In case of 3GPP LTE FDD system, if an eNB transmits uplink scheduling information to a UE in a subframe #n, the UE is configured to transmit uplink data in a subframe #n+4 in response to the uplink scheduling information. Hence, if a specific RP intends to receive uplink data by avoiding interference in a specific resource, the specific RP should be able to anticipate interference attribute in the specific resource in advance.

As mentioned in the foregoing description, in order for each RP to anticipate interference of an uplink transmission resource at the time of scheduling uplink transmission, the present invention proposes to designate a series of resources of which an interference attribute is identical or similar to each other and exchange information on the resources between RPs. In this case, a series of resources may correspond to time resources represented by such a unit as a subframe, frequency resources represented by such a unit as a resource block or resources represented by a combination of time and frequency, e.g., resources consisting of specific RBs of specific subframes. In particular, since there exist many restrictions for a signal received by the RP #1 to perform scheduling of giving constant interference in a whole frequency band or a whole subframe of the RP #2, grouping of the resources represented by the combination of time and frequency can provide more flexible interference control.

Hence, regarding a resource not designated by the information exchange, interference measurement and uplink scheduling can be performed without a separate assumption on interference. Or, a resource group incapable of assuming a prescribed interference can be separately designated and informed. It shall be explained in more detail with reference to drawing in the following.

Figure 10:
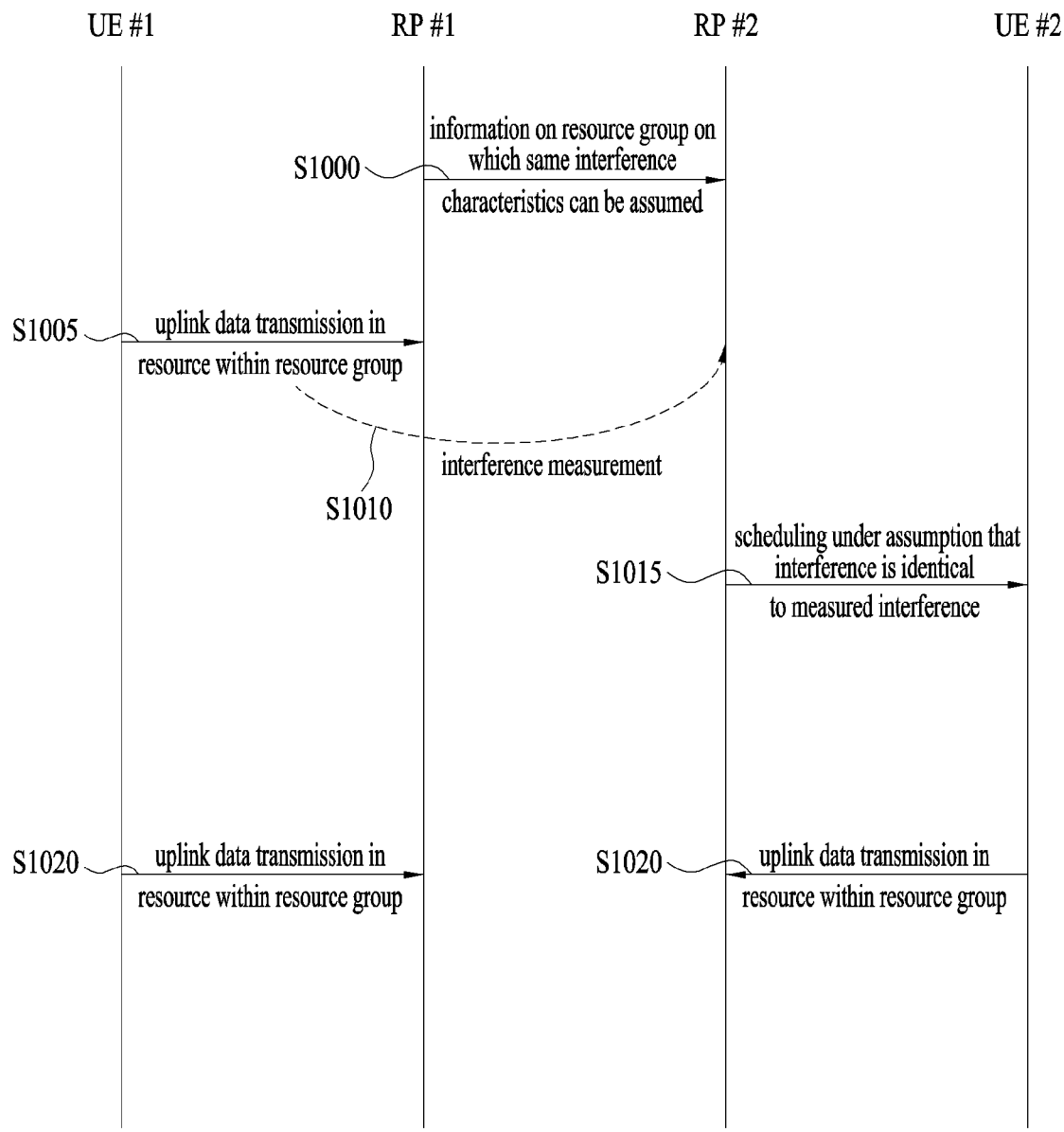
FIG. 10 is a signal flowchart for an example of performing uplink communication via interference control according to embodiment of the present invention.

FIG. 10 is a signal flowchart for an example of performing uplink communication via interference control according to embodiment of the present invention. In particular, assume that a situation of FIG. 10 is identical to a situation of FIG. 9.

Referring to FIG. 10, first of all, an RP #1 groups a series of resources into a group and informs an RP #2 of information on the group via a backhaul link in the step S1000. In this case, as mentioned in the foregoing description, a resource group can include a set of subframes or PRBs (physical resource blocks), a set of specific PRBs in a specific subframe and the like. In this case, the RP #1 can inform the RP #2 that identical or similar interference is to be granted for resources belonging to an identical group. Of course, the RP #1 can configure a plurality of resource groups and may be then able to grant interference different from each other according to a resource group. In the following, for clarity, assume that a resource group is configured by a set of specific PRBs in a specific subframe.

Subsequently, a UE #1 transmits uplink data to the RP #1 in a resource belonging to the resource group in the step of S1005 and the RP #2 measures interference due to the uplink data in the step S1010. Specifically, the RP #2 performs interference measurement in a specific PRB #m1 of a specific subframe #n1 belonging to the resource group and identifies interference attribute anticipated in the resource group.

Subsequently, in case that the RP #2 performs scheduling of a PRB #m2 of a subframe #n2 corresponding to a next resource belonging to a group identical to the group of the PRB #m1 of the subframe #n1, the RP #2 performs scheduling capable of minimizing impact of interference under an assumption that the identified interference attribute is maintained in the step S1015. Lastly, the UE #1 and a UE #2 transmit uplink data to the RP #1 and the RP #2, respectively, in the PRB #m2 of the subframe #n2 based on the scheduling in the step S1020.

Meanwhile, in case of grouping time resources, it may consider a HARQ operation interval. In 3GPP LTE system, a HARQ operation for uplink data transmission is defined to be performed on a certain timing point only. Specifically, if uplink data transmitted in a specific subframe fails, the uplink data can be retransmitted only in a subframe designated by a predetermined rule. For instance, in case of a FDD system, retransmission for transmission in a subframe #n is performed in a subframe # (n+8). In case of a TDD system, a retransmission timing is designated according to uplink/downlink configuration as shown in Table 4. In general, since transmission of an identical UE is highly probable to affect similar interference to a neighboring RP, it is preferable to configure, i.e., group the resource group by a series of subframes in which retransmissions for an identical packet occur in HARQ operation.

The aforementioned resource group-based interference control is effective especially when reception beamforming is performed in a manner of installing a plurality of antennas in each RP.

FIG. 11 is a diagram for an example of performing an interference control operation based on a resource group according to embodiment of the present invention.

Referring to FIG. 11, first of all, an RP #1 assumes that all resources are divided into three resource groups and delivers information on each resource group to which time/frequency resource belongs thereto to an RP #2 via a backhaul link.

The RP #1 schedules terminals positioned at a boundary area between the RP #1 and the RP #2 in a resource group #1 based on the information. In this case, since the RP #2 is able to measure strong interference from a direction of the RP #1 in the resource group #1, the RP #2 performs reception beamforming in a direction far from the RP #1 in a resource classified into the resource group #1 and receives an uplink signal of a terminal positioned at a corresponding position.

And, the RP #1 schedules a terminal far from the RP #2 in a resource group #2. In this case, since interference measured by the RP #2 is not strong in a direction of the RP #1 as well, the RP #2 performs reception beamforming in accordance with a direction of the RP #1 in a resource classified into the resource group #2 and schedules a terminal.

Lastly, a resource group #3 corresponds to a resource group in which a prescribed interference is not promised. The RP #1 schedules a random terminal without a scheduling restriction. Since interference is measured in an unpredictable direction, it is difficult for the RP #2 to apply reception beamforming in a specific direction. In this case, the RP #2 may use the resource group #3 as little as possible.

Meanwhile, the RP #2 receiving information on the resource group and performing an interference control operation can provide information suitable for a currently configured resource group to the RP #1. The RP #1 can appropriately update a resource grouping and scheduling related to the resource grouping using the feedback information. Feedback information provided to the RP #1 by the RP #2 may include followings.

1) The RP #2 determines whether interference measured in each resource group is appropriate for a use of the RP #2 and informs the RP #1 of a result of the determination. Specifically, the RP #2 can inform the RP #1 of information on a size of interference and variation measured in each resource group. If interference of abnormally strong power is measured or variation of interference is abnormally big, the RP #2 operates to enable the RP #1 to reduce the interference power or the variation of the interference.

2) The RP #2 performs interference measurement in each resource group, selects a resource group appropriate for scheduling of the RP #2, i.e., a resource group in which interference of a type suitable for receiving a signal is measured, and can inform the RP #1 of the selected resource group. In this case, the RP #1 operates to maintain constant interference in the resource selected by the RP #2. On the contrary, the RP #1 can perform scheduling without any restriction in an unselected resource since the RP #2 does not anticipate uniform interference in the unselected resource.

3) Additionally, the RP #2 can inform the RP #1 of resource utilization used by the RP #2 in each resource group. In particular, the RP #2 informs the RP #1 of percentage of resource utilization actually utilized by the RP #2 among a resource group designated by the RP #1. The RP #1 can identify how a specific resource group is usefully utilized by the RP #2 using the information.

4) Lastly, the RP #2 may designate a resource causing abnormally strong interference or a resource causing abnormally weak interference among a resource group and inform the RP #1 of the resource. In general, although resources are included in an identical resource group, since interference attribute measured in each of the resources may vary according to scheduling of the RP #1, the RP #1 to which the aforementioned information is provided can identify scheduling advantageous to the RP #2.

Figure 12:
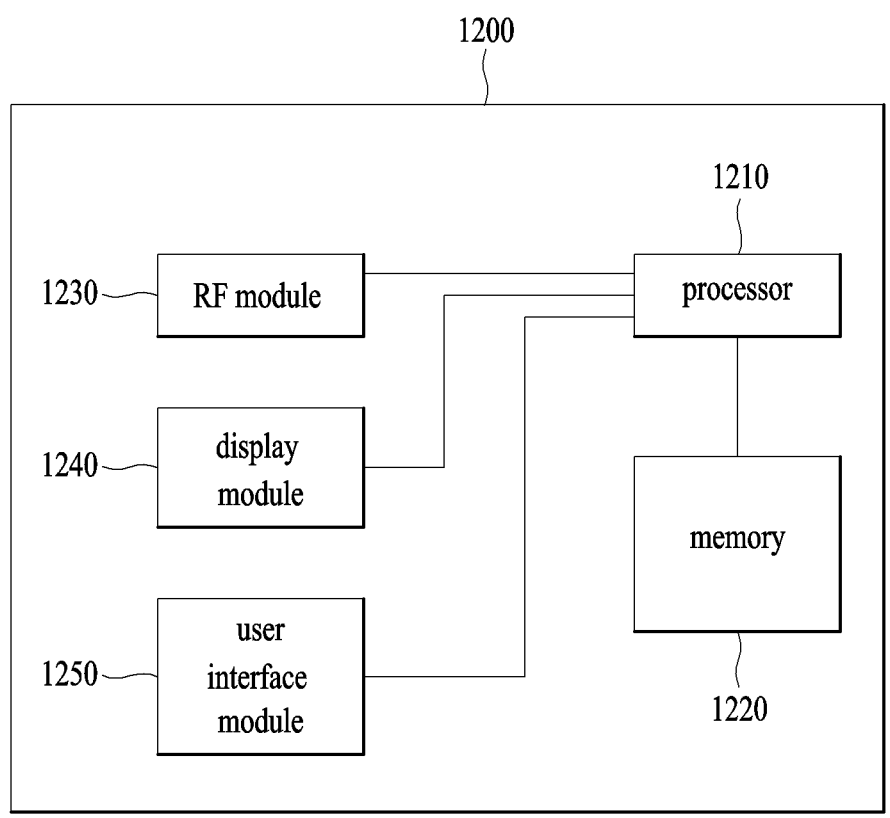
FIG. 12 is a block diagram for an example of a communication device according to one embodiment of the present invention.

FIG. 12 is a block diagram for an example of a communication device according to one embodiment of the present invention.

Referring to FIG. 12, a communication device 1200 may include a processor 1210, a memory 1220, an RF module 1230, a display module 1240, and a user interface module 1250.

Since the communication device 1200 is depicted for clarity of description, prescribed module(s) may be omitted in part. The communication device 1200 may further include necessary module(s). And, a prescribed module of the communication device 1200 may be divided into subdivided modules. A processor 1210 is configured to perform an operation according to the embodiments of the present invention illustrated with reference to drawings. In particular, the detailed operation of the processor 1210 may refer to the former contents described with reference to FIG. 1 to FIG. 11.

The memory 1220 is connected with the processor 1210 and stores an operating system, applications, program codes, data, and the like. The RF module 1230 is connected with the processor 1210 and then performs a function of converting a baseband signal to a radio signal or a function of converting a radio signal to a baseband signal. To this end, the RF module 1230 performs an analog conversion, amplification, a filtering, and a frequency up conversion, or performs processes inverse to the former processes. The display module 1240 is connected with the processor 1210 and displays various kinds of informations. And, the display module 1240 can be implemented using such a well-known component as an LCD (liquid crystal display), an LED (light emitting diode), an OLED (organic light emitting diode) display and the like, by which the present invention may be non-limited. The user interface module 1250 is connected with the processor 1210 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of managing a serving cell in a wireless communication system to which a carrier aggregation technique is applied and an apparatus therefor are described with reference to examples applied to 3GPP LTE system, it may be applicable to various kinds of wireless communication systems as well as the 3GPP LTE system.

What is claimed is:

1. A method of receiving a first uplink signal, which is received by a specific reception point from a terminal based on interference control in a base station cooperative wireless communication system, the method comprising:

receiving information on a plurality of resource groups including a first resource group and a second resource group, wherein the first resource group includes a plurality of subframes configured for retransmissions according to a Hybrid Automatic Repeat and Request (HARQ) operation for a terminal communicating with a neighboring reception point;

measuring interference, which is caused by a second uplink signal transmitted to the neighboring reception point by the terminal, in a resource corresponding to a subframe belonging to the plurality of subframes of the first resource group;

transmitting uplink signal scheduling information in the second resource group to the terminal to minimize the measured interference; and receiving the first uplink signal from the terminal in resources of the second resource group.

2. The method of claim 1, wherein the transmitting uplink signal scheduling information comprises:

determining reception beamforming based on a characteristic of the measured interference; and transmitting information about the reception beamforming in the uplink signal scheduling information.

3. The method of claim 1, further comprising transmitting interference control feedback information to the neighboring reception point for updating the information on the plurality of resource groups at the neighboring reception point.

* * * * *